April 15, 1930. E. S. PRESTON 1,754,800
DUPLEX ELECTRIC WAFFLE IRON
Filed Jan. 24, 1929 3 Sheets-Sheet 1
Fig. 1.
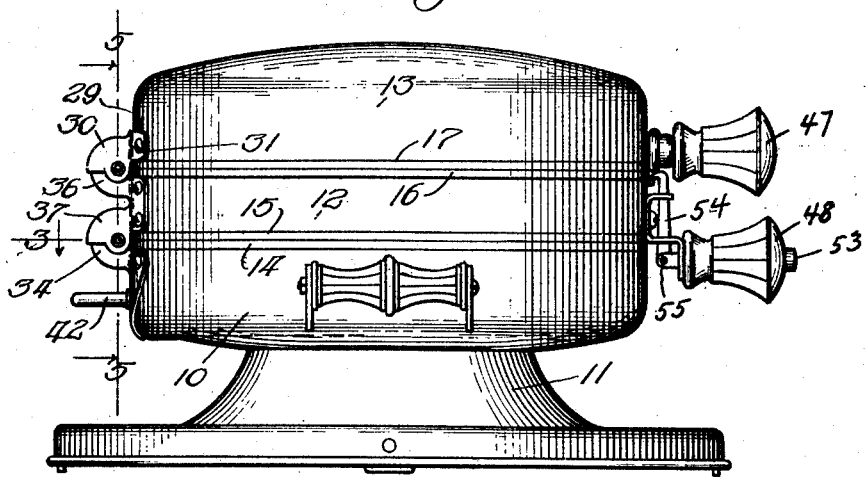
Fig. 4.
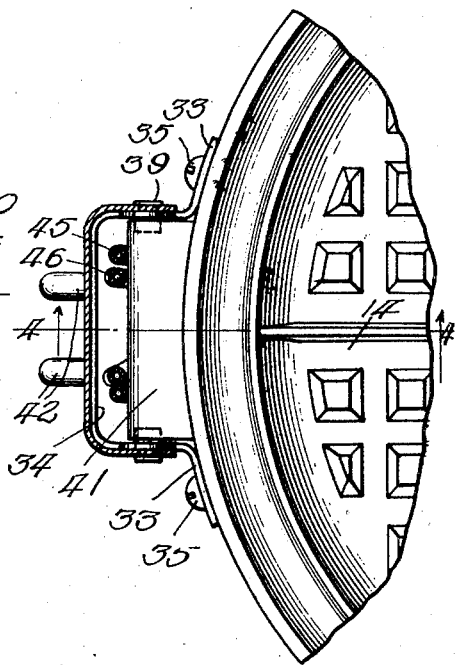
Fig. 3.
Inventor:
Edward S. Preston
by Albert Scheith
Attorney April 15, 1930. E. S. PRESTON 1,754,800
DUPLEX ELECTRIC WAFFLE IRON
Filed Jan. 24, 1929 3 Sheets-Sheet 2
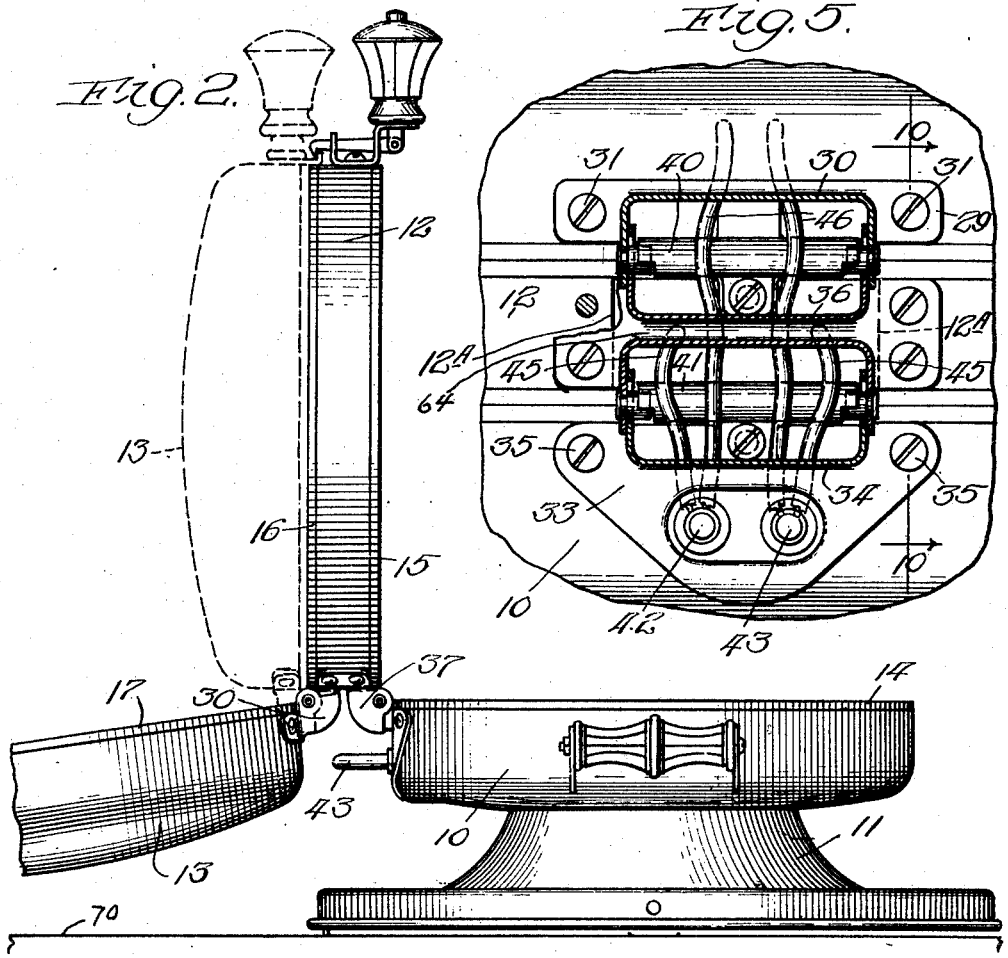
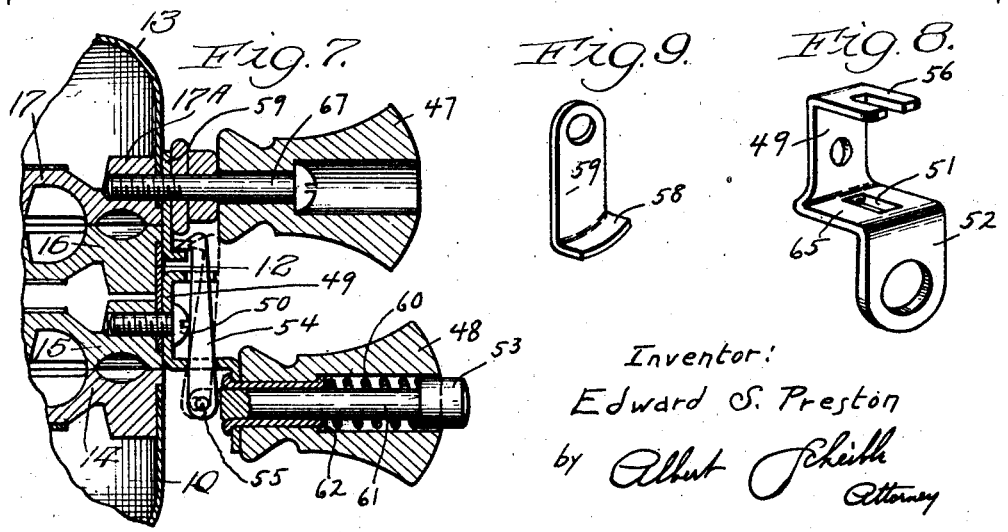
Inventor:
Edward S. Preston
by Albert Scheible
Attorney April 15, 1930.　　　E. S. PRESTON　　　1,754,800
DUPLEX ELECTRIC WAFFLE IRON
Filed Jan. 24, 1929　　　3 Sheets-Sheet 3
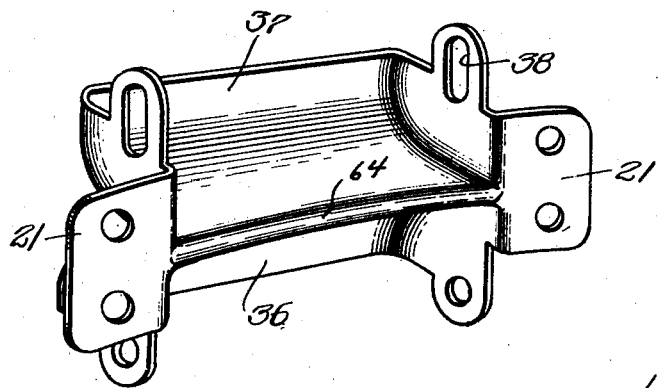
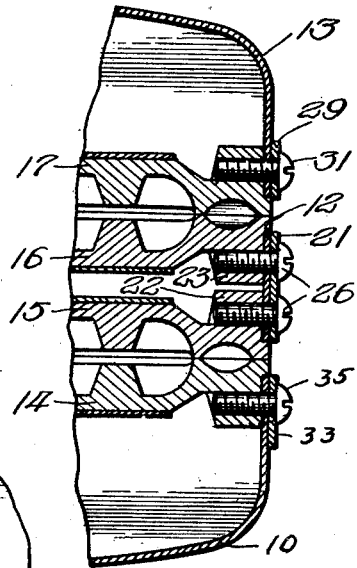
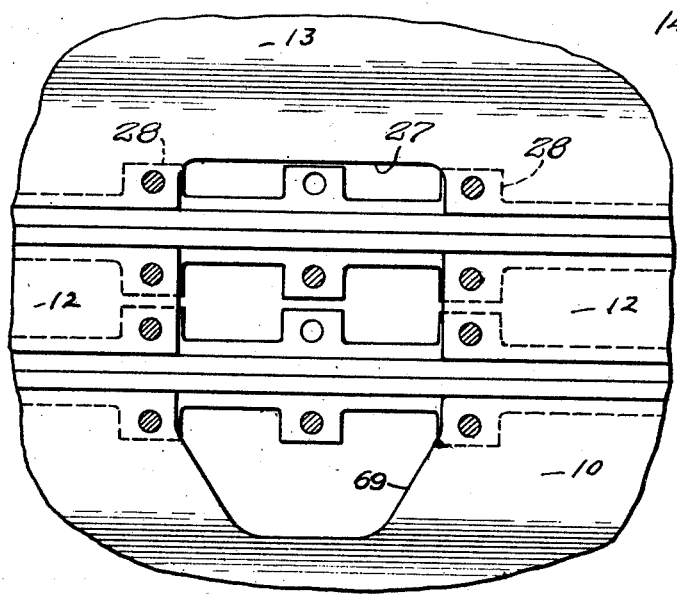
Inventor:
Edward S. Preston
by Albert Scheib
Attorney Patented Apr. 15, 1930

1,754,800

UNITED STATES PATENT OFFICE

EDWARD S. PRESTON, OF CHICAGO, ILLINOIS, ASSIGNOR TO CHICAGO ELECTRIC MANUFACTURING CO., OF CHICAGO, ILLINOIS, A CORPORATION OF ILLINOIS

DUPLEX ELECTRIC WAFFLE IRON

Application filed January 24, 1929. Serial No. 334,840.

My invention relates to the class of appliances employed for baking articles of food (such as waffles or doughnuts) with heat applied simultaneously from below and above the batter and more particularly to a baking appliance suitable for simultaneously and economically baking two superposed batches of the batter or other initial composition of the food.

In some of its general objects, my invention aims to provide a duplex baking appliance of this class presenting the following advantageous features in an appliance comprising three superposed and relatively movable sections:

(1) A two-hinge hinging arrangement entirely housing the wires leading from the bottom section to the middle and top sections, including means for preventing undue bending of the wires.

(2) A two-hinge hinging arrangement comprising a lower and an upper hinge, with a part of the upper hinge serving to limit the separational movement of two baking plates in the middle section.

(3) Releasable means for latching the top section to the middle section to permit the two upper sections to be swung conjointly about the axis of the lower hinge.

(4) A lower hinge constructed for limiting such conjoint swinging to a position in which the two upper sections are approximately upright and in which the center of gravity of the two upper sections is outward of the lower hinge axis from the bottom section.

(5) An upper hinge constructed for limiting the swinging of the top section with respect to the middle section to a position in which the top section is approximately upright and has its center of gravity outward of the upper hinge axis when the middle section is in its normal position, and for also limiting this swinging away from the raised middle section to a position in which the top section will not engage a flat surface on which the appliance is seated.

(6) A latching arrangement cooperating with the upper hinge for normally holding the upper section in axial alinement with the middle section.

(7) A latching arrangement disposed for expeditious operation by a hand grasping a handle on one of the upper two sections.

(8) A latching arrangement partially concealed by such a handle.

(9) A novel construction and assembly of the middle section of the casing of the appliance.

Still further and also more detailed objects will appear from the following specification and from the accompanying drawings, in which—

Fig. 1 is a side elevation of an electric waffle iron embodying my invention, showing the three sections in their normal superposed positions.

Fig. 2 is an enlarged side elevation of the same waffle iron, showing the middle and top sections in their extreme outward positions, a portion of the top section being broken away and the top section being also shown in dotted lines in the raised position which it occupies when latched to the raised middle section.

Fig. 3 is an enlarged and fragmentary horizontal section, taken along the line 3 of Fig. 1 or Fig. 4.

Fig. 4 is a similarly enlarged fragmentary and vertical section, taken along the line 4—4 of Fig. 3.

Fig. 5 is an enlargement of a partial end elevation, taken from the line 5—5 of Fig. 1.

Fig. 6 is an enlarged interior perspective view of the intermediate hinge casing portion which forms a part of the casings for both the upper and lower hinges.

Fig. 7 is an enlarged and fragmentary vertical section taken along the axes of the handles on the top and middle section of the waffle iron, showing these sections as interlatched, and with dotted lines showing the latching lever in its released position.

Fig. 8 is an enlarged perspective view of the bracket on which the latching lever rocks.

Fig. 9 is an enlarged perspective view of the latch plate fastened to the top casing section.

Fig. 10 is a fragmentary vertical section taken along the line 10—10 of Fig. 5.

Fig. 11 is a fragmentary end elevation, looking in the same direction as Fig. 5, but with the hinging means detached.

In the illustrated embodiment, my electric waffle iron has a casing formed of three parts, namely: a bottom portion including a cup-shaped bottom casing section 10 and a pedestal 11; a short tubular middle section composed mainly of a flat band 12; and an inverted cup-shaped top section 13. The peripheral walls of the two cup-shaped casing sections 10 and 13 are desirably cylindrical and of the same outside diameter as the tubular middle section 12. This uniform outside diameter also desirably is the same as that of the four baking plates, which baking plates comprise a bottom baking plate 14 mounted in the bottom casing section 10, two vertically spaced baking plates 15 and 16 mounted in the tubular middle casing section 12, and a top baking plate 17 mounted in the top casing section 13.

A bottom electric heating member 18 underhangs the bottom baking plate 14 and is desirably a counterpart of a top electric heating member 19 disposed above the top baking plate 17, while a middle electric heating member 20 is disposed between the baking plates 15 and 16 in the middle casing section so as to heat both of the latter plates. This middle heating member is preferably of greater wattage and heat-radiating capacity than either of the heating members 19 and 20.

Each baking plate is desirably thicker than the portion exposed flush with the outer wall of the casing section housing it, and has the periphery of all except this exposed portion contracted in diameter to fit the bore of the corresponding casing section, as shown in Figs. 7 and 10, thereby affording annular horizontal shoulders against which the casing sections abut. Thus arranged, the major portion of the bottom baking plate 14 fits down into the bottom casing section 10, the top baking plate 17 has its major portion fitted upwardly into the top casing section 13, and the band 12 forms a tube which fits around the major peripheral portions of the intermediate baking plates 15 and 16 between the larger diametered exposed peripheral portions of the latter. This band 12 is desirably bent from a flat metal strip shorter than the periphery of the said major portions of the plates 15 and 16, leaving the ends 12A of the band spaced apart (as shown in Fig. 5) by a distance greater than the length of that part of the intermediate hinge casing (this hinge casing being shown separately in Fig. 6) which is between the end ears 21 of the said hinge casing.

The two intermediate heater plates 15 and 16 have circumferentially spaced lugs (22, 23) provided with tapped bores (24, 25) respectively corresponding to the upper and the lower perforations in both the said hinge casing ends 21 and the two ends of the metal band 12, so that the intermediate hinge casing portion can be secured to these lugs 22 and 23 by screws 26 each extending inwardly through one of the ears 21 and one end of the band 12 into one of these lugs—as shown in Fig. 10.

The top casing section 13 has a recess 27 opening at its lower edge between two lugs 28 formed on the top heater plate 17 and to which the end ears 29 of the upper hinge leaf 30 are fastened by screws 31. The bottom casing section has an upwardly open recess 69 in vertical alinement with the said recess 27 and between lugs 32 to which the riser plate 33 of the bottom hinge leaf 34 is fastened by screws 35.

The intermediate part of the hinge casing, as shown separately in Fig. 6, comprises two superposed scoop-shaped portions 36 and 37 which respectively open upwardly and downwardly, and both of which are concaved toward the body of the waffle iron. Each end of each such scoop-shaped portion has a perforation 38 for journaling the smaller-diameter part of a pintle 39 fastened to one end of scoop shaped main portions (30, 34) of the companion hinge casing members. The upper perforations 38 in the intermediate hinge portion and the corresponding perforations in the lowest hinge portion allow vertical movement of both the middle and the upper casing section when the batter between opposed heating plates expands during the baking. I also desirably fasten curved guards 40 and 41 respectively to the heater plates 14 and 16, each of which guards extends in hook formation within one scoop shaped part of the intermediate hinge casing portion and presents a convex surface (of larger diameter than the pintles 39) over which surfaces the adjacent wires can bend.

Mounted on the lower hinge leaf 33 and extending into the interior of the bottom casing section 10 are terminal plugs 42 and 43, each of which is connected by a wire 44 to one terminal of the bottom electric heating member 18. Two wires 45 extend through the recess 29 in the lower casing section, and through both the bottom hinge casing part 34 and the lower scoop-shaped part 36 of the intermediate hinge casing portion over the lower guard 45 to the gap between the ends of the band 12 and to the middle electric heating member 20. Then a third pair of wires 46 extends similarly from the terminal plugs 42 and 43 through both the upper and lower hinge casing parts and the recess 27 into the upper casing section, to the terminals of the top heating member 19, and these wires pass outward of both of the guards 41 and 40.

Thus arranged, the wires which connect the terminal plugs respectively to the top and the middle heating member have portions continually housed by the hinge casing parts, and the guards together with the rounded junctures 64 of the two scoop-shaped parts of the middle hinge section prevent any sharp kinking of these wires when the wires bend back and forth during the movement of either or both of the two upper casing sections about the horizontal hinge axes, each of which axes is the common axis of one pair of the said pintles 39.

To move the two upper casing sections (along with the baking plates and heating members carried by them), I provide two handles, preferably diametrically opposite the above described hinging means, namely, an upper handle 47 fast with respect to the top casing section 13 and the top heating plate 17, and a lower handle 48 fast with respect to the middle casing section 10 and the middle heating plate 15. Then I also provide releasable means for latching the top casing section to the middle casing section, so that these two sections can be swung as a unit (about the lower hinge axis) with respect to the lower and stationary casing section, and I preferably dispose the needed latch adjacent to the two handles 48 and 47.

For this purpose, I desirably support the lower handle 48 from the middle casing section by a guide bracket, (shown separately in Fig. 8), which guide bracket has a riser portion 49 fastened by a screw 50 extending through the band 12 into the lower intermediate baking plate 15. This guide bracket also includes an outwardly extending horizontal portion 65 provided with a slot 51 extending radially of the heater casing and continued by a depending arm 52 to which the lower and tubular handle 48 is fastened. A plunger 53 extends slidably through the bore of this lower handle and projects beyond both ends of the handle.

Projecting through the slot 51 is a latching member 54 which is pivoted to the inner and desirably forked end of the plunger 53 by a screw 55, and which has a somewhat higher portion laterally guided by the arms of an outwardly directed forked arm 56 forming the upper end of the said guide bracket. The latching member 54 has at its upper end an inwardly directed hooking finger which normally extends above an outwardly directed keeper web 58 (Fig. 9) on a latch plate 59 fastened to the top casing section in any suitable manner, as by clamping this latch plate between the top casing section 13 and the upper handle 46 by the screw 67 which fastens that handle to a lug 17A on the upper baking plate 17.

The part of the latching member 54 which extends through the slot 51 is desirably only slightly narrower (radially of the waffle iron) than the length of this slot, so that the latching member can rock in the slot but is limited in its outward swinging by the outer end of the slot. A compression spring 60 interposed between a projection 61 on the plunger 53 and a shoulder 62 within the bore of the lower handle 47 continually urges the plunger outward of the waffle iron body, thereby rocking the latching member so as to hold its hook on its upper end above the keeper web 58 of the latch plate. However, the resulting latching can instantly be released by pressing the projecting end of the plunger inwardly, thereby rocking the latching member to its released position as shown in dotted lines in Fig. 7, and this can readily be done by a finger of the same hand of the user which grasps the lower handle.

In using my electric waffle iron (when the plug terminals 42 have been connected to a source of current), a simple lifting of the lower handle swings the interlatched middle and upper casings and their contents upwardly to the positions shown in Fig. 2 in full lines for the middle section and in dotted lines for the top section. This swinging movement extends to a position in which the center of gravity of the middle section is radially outward of the heater casing from the lower hinge axis, so that gravity will hold the two upper sections in their joint raised position, and the swinging movement is stopped at this point by the engagement of the free edge of the lower scoop-like portion 36 of the intermediate hinge casing portion with a part of the lower hinge casing 37.

After pouring batter on the then exposed lowest baking plate 14, the user swings both of the two upper casing portions back to their normal position of Fig. 1, presses the plunger 53 inward to release the latch, and thereafter raises the released upper section alone by means of the upper handle 47. Or, the user may release the latch while both of the upper sections are in their said jointly raised position, and can then hold the top section upright while lowering the middle section. In either case, such operation leaves the middle section in its normal horizontal position, while the top section is prevented from further outward swinging by the engagement of the free edge of the scoop-shaped part 37 of the upper hinge casing with a part of the intermediate casing portion, the top section being then substantially upright and with its center of gravity outward of the upper hinge axis so that gravity will retain this section in its raised position while batter is poured on the then exposed baking plate 15. When the top section is thereafter lowered to its normal position of Fig. 1, the keeper web 58 of the latch plate engages the sloping upper face of the hooking finger of the pivoted latching member 54 to rock the latter momentarily away from the waffle iron casing until the finger again is above the said keeper web, after which the spring 60 acts through the plunger to rock the latching member back to its latching position.

When the user wishes to clean the exposed face of the top baking plate 16, he can release the latch and swing the upper section alone to the position shown in full lines in Fig. 2, thereby exposing the top baking plate with its baking face upwards. In this position, the above described relation of the hinge casing portions halts the top plate in an outwardly swung and approximately horizontal position in which the top of the casing is freely spaced from the table 70 on which the waffle iron is seated, as shown in Fig. 2, thereby preventing an overheating of this table.

By using a metal band as the major portion of the intermediate casing section, with the spaced ends of the band covered by the intermediate hinge casing, I secure an inexpensive construction for this part of the casing of my waffle iron; and such a band can readily be ornamented if desired, before bending it to the needed curvature.

By providing gaps between the heater plate lugs to which the hinge casing portions are fastened, I permit the wires to extend between such lugs and also allow ample space for the parts of the wires which are bent over the rounded medial edge 64 in the intermediate hinge casing, so that these bends in the wires can extend inwardly beyond the general bore of the casing (as shown in Fig. 4), thereby reducing the size of the needed hinge casings.

However, while I have heretofore described my invention in a desirable embodiment, I do not wish to be limited to the details of the construction and arrangement thus disclosed, as changes might be made without departing either from the spirit of my invention or from the appended claims. Nor do I wish to be limited to the use of the various features of my invention jointly with each other.

I claim as my invention:

1. A waffle iron or the like comprising a base section, a middle section hinged to the base section, a top section hinged to the middle section, and releasable latching means normally latching the upper section to the middle section to permit these sections to be swung conjointly about the hinged connection of the middle section to the base section, in combination with a handle fastened to one of the upper two sections; the latching means including an actuating member extending slidably through and supported by the said handle.

2. A waffle iron or the like comprising a base section, a middle section hinged to the base section, a top section hinged to the middle section, releasable latching means normally latching the upper section to the middle section to permit these sections to be swung conjointly about the hinged connection of the middle section to the base section, and a handle on one of the upper sections, the latching means including an actuating member supported by the handle, and a spring housed by the handle and resisting a movement of the actuating member in its latching releasing direction.

3. A waffle iron comprising a base section, a middle section hingedly connected thereto, and a top section hingedly connected to the middle section; a keeper fast on one of the two upper sections; a bracket mounted on the other of the two upper sections; a latching member having a portion normally engaging the keeper, the latching member being disposed for rocking on the bracket; an actuating member associated with the latching member and movable in one direction for rocking the latching member out of engagement with the keeper, and a spring resisting the movement of the actuating member in the said direction.

4. A waffle iron comprising a base section, a middle section hingedly connected thereto, and a top section hingedly connected to the middle section; a keeper fast on one of the two upper sections; a bracket mounted on the other of the two upper sections; a latching member having a portion normally engaging the keeper, the bracket having a portion upon which the latching member rocks and another portion engaging the latching member to guide the latter for movement in a single plane during its rocking movement.

5. A waffle iron comprising a base section, a middle section hinged at one side thereof to the base section, a top section hinged at the same side thereof to the middle section, a keeper fast on one of the upper two sections at the opposite side of the waffle iron from the said hinging, a bracket mounted on the other of the two upper sections, a latching member disposed for rocking on the bracket and having a portion normally engaging the keeper, and spring means normally holding the said portion of the latching member in engagement with the keeper.

6. A waffle iron comprising in relatively superposed relation a base section, a middle section and a top section, two hinging means disposed at the same side of the waffle iron and having parallel horizontal axes; one of the hinging means connecting the middle section with the base section and being arranged to limit the upward swinging movement of the middle section to about ninety degrees; the second hinging means connecting the middle section with the top section and being arranged to limit the swinging movement of the top section to about ninety degrees away from the middle section, the second hinging means serving to support the top section in inverted position and free of the base section when the middle section is swung upwards and the top section is swung further in the same direction.

7. A waffle iron or the like comprising three normally superposed baking sections, lower hinging means interposed between the bottom section and the intermediate section, and upper hinging means interposed between the intermediate section and the top section, the said hinging means having parallel axes at the same side of the waffle iron; each of the hinging means being arranged for limiting the relative movement of the consecutive sections to approximately ninety degrees, thereby permitting the intermediate section to be swung approximately ninety degrees and the upper section approximately 180 degrees with respect to the bottom section.

8. A waffle iron or the like comprising three normally superposed baking sections, lower hinging means interposed between the bottom section and the intermediate section, and upper hinging means interposed between the intermediate section and the top section, the said hinging means having parallel axes at the same side of the waffle iron and each of the hinging means including two hinge casings parts respectively fastened to the two baking sections between which that hinging means is interposed, the said hinge casing parts having relatively interengageable parts disposed for permitting a relative movement of the last named two baking sections to about ninety degrees regardless of the position of the intermediate section.

9. A baking appliance including in normally superposed disposition a basal casing section, a middle casing section and an upper casing section, each of the three casing sections having an opening at the same side of the appliance, electrically heated baking plates respectively mounted in the said casing sections; hinging means jointly closing the said openings and including a lower upwardly and inwardly open scoop-shaped hinge member fast on the basal casing section, an upper downwardly and inwardly open scoop-shaped hinge member fast on the upper casing section, and an intermediate hinge member fast on the middle casing section and comprising superposed downwardly and upwardly open scoop-shaped portions respectively associated with the said upper and lower hinge members; and two pairs of flexible wires extending from the basal section through the scoop-shaped portion of the lower hinge member and the downwardly open scoop-shaped portion of the intermediate hinge member into the middle casing section; one pair of wires leading to the baking plate in the middle section, the other pair of wires extending through the upwardly open scoop-shaped portion of the intermediate hinge member and through the upper hinge member to the baking plate in the upper section.

10. A baking appliance as per claim 9, in which the intermediate hinge section has a ledge connecting the inward edges of its scoop-shaped portions, over which ledge the wires of the second pair are bent.

11. An electric baking appliance comprising relatively movable base, intermediate and upper casing sections, two baking plates fast respectively in the upper and lower casing sections; and two vertically spaced baking plates fast in the intermediate casing section, the intermediate casing section comprising a sheet metal strip curved around and secured to perpiheral portions of both of the intermediate baking plates.

12. A baking appliance including a cup-shaped basal casing portion, a tubular middle casing portion and an upper inverted cup-shaped casing portion hinged to the middle casing portion; and superposed hinge members connecting the middle casing portion respectively with the basal and with the upper casing portion; the tubular middle casing portion comprising a metal band curved flatwise and presenting spaced ends, overlapped by one of the hinge members to conceal the gap between the said ends 13. In an electric waffle iron, a casing comprising a basal section, a tubular middle section normally seated on the basal section, a lower hollow hinging means connecting the middle section with the basal section on a horizontal hinge axis, an upper section normally seated on the middle section, an upper hollow hinging means disposed above the lower hinging means at the same side of the waffle iron and connecting the upper section with the lower section on a horizontal hinge axis; lower, middle and upper electric heating plates respectively mounted in the basal, middle and upper sections; circuit wires leading from the basal section through the lower hinging means to the middle heating plate; and circuit wires leading from the basal section to the upper heating plate, the last named wires extending through the lower hinging means into the interior of the middle section and then through the upper hinging means into the interior of the upper section, the hinging means having portions thereof disposed outward of the said wires in all positions of the said casing sections.

14. A baking appliance as per claim 9, in which the intermediate hinge section has a ledge connecting the inward edges of its scoop-shaped portions, over which ledge the wires of the second pair are bent, and in which the middle casing sections has openings facing the intermediate hinge section and into which openings the thus formed bends of the said wires of the second pair extend.

15. A baking appliance including a cup-shaped basal casing portion, a tubular middle casing portion and an upper inverted cup-shaped casing portion hinged to the middle casing portion; and superposed hinge members connecting the middle casing portions respectively with the basal and with the upper casing portion; in combination with two baking plates respectively socketed in the upper and lower casing portions, and two other baking plates respectively socketed in the upper and lower ends of the middle casing portion; each of the said baking plates having a peripheral shoulder overhanging the mouth of the casing portion in which it is socketed, and means fastening each of the baking plates to the casing portion in which it is socketed conjointly with one of the hinge members.

Signed at Chicago, Illinois, January 21st, 1929.

E. S. PRESTON.